Aug. 5, 1930.                    W. S. SMITH                    1,772,294
                                   SCALE
                             Filed April 4, 1928
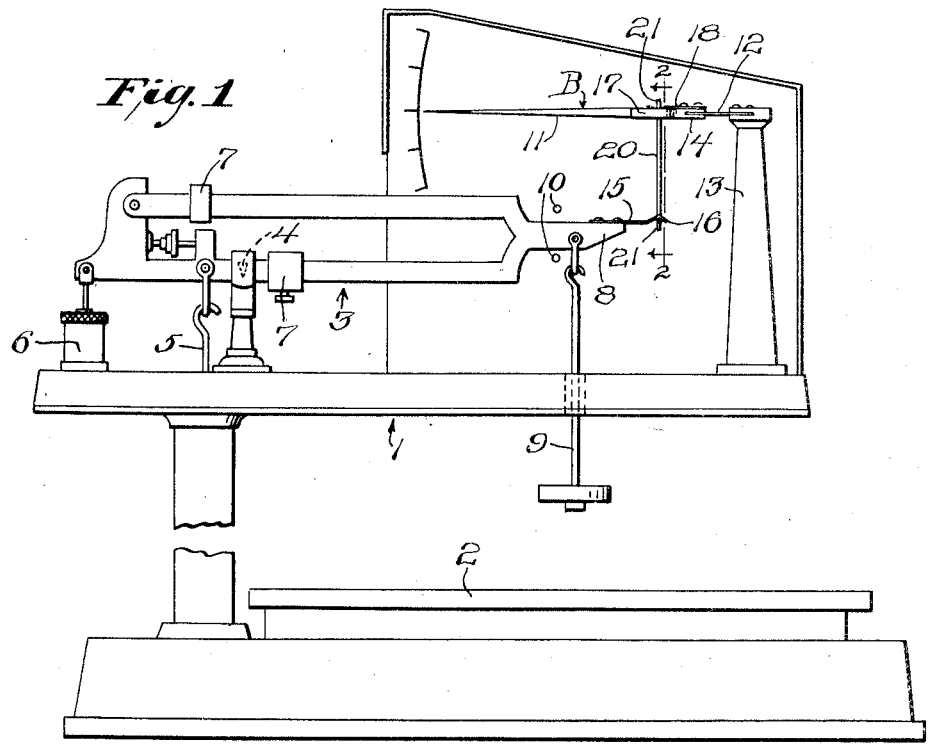
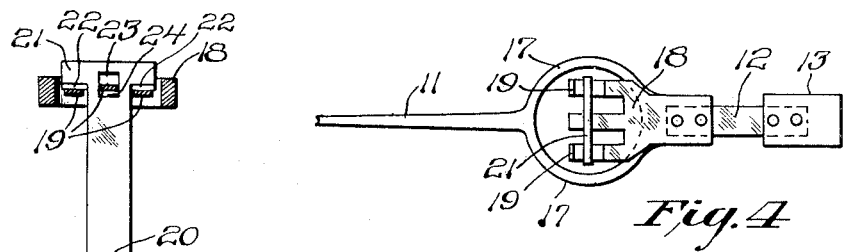
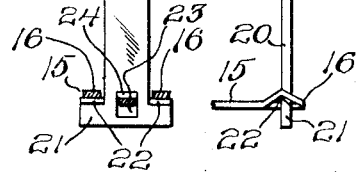
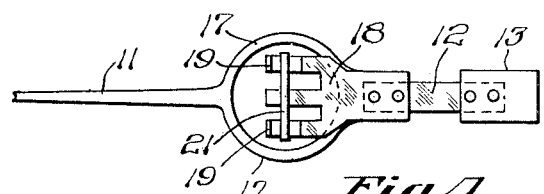
Inventor
Walter S. Smith
By W. S. McDowell.
Attorney Patented Aug. 5, 1930

1,772,294

UNITED STATES PATENT OFFICE

WALTER S. SMITH, OF COLUMBUS, OHIO

SCALE

Application filed April 4, 1928. Serial No. 267,440.

This invention relates to improvements in weighing scales and has particular reference to scales of the so called platform type including a pivotally mounted beam which is adapted to be counterweighted for the purpose of balancing the applied weight on the platform and to permit of the determination of the weight of the bodies or objects applied to the platform by reference to the known or predetermined weights on the beam when the latter reaches a state of equilibrium or balance.

In scales of this type the service is heavy and the scales are constructed so as to be particularly adapted for the weighing of large, heavy objects or bodies and the operator depends largely upon his skill in determining when the beam reaches a true position of balance. Since this movement in the ordinary platform scale of the beam is very limited it follows that in weighing large bodies of materials error of considerable proportions enters into practically every weighing operation, which results in loss to either the buyer or the seller. It is therefore an outstanding object of the present invention to provide an indicating attachment for such scales by means of which the movement and positions of the beam either under or over a given position of balance may be read or determined with accuracy and convenience, to the end of insuring the determination of weights within limits of a fractional part of an ounce and with much greater accuracy than can be obtained with the ordinary type of platform scale.

Another object of the invention resides in the provision of a platform scale provided with a pivotally mounted balanced beam, wherein one end of the beam, farthest removed from the pivotal mounting, is flexibly connected with a resiliently mounted indicator arm, the latter being carried by the frame of the scale and adapted to swing in unison with the beam, but with greatly multiplied movement with respect to the beam, in order that the operator of the scale, by reference to the outer end of the indicator arm, and the position of the latter with respect to a graduated surface, may determine easily and instantly the operating position of the beam with reference to a normal balanced position.

With these and other objects in view, as will appear as the description proceeds, the invention consists in the novel features of construction, combinations of elements and arrangements of parts hereinafter to be more fully described and pointed out in the appended claims.

In the accompanying drawing:

Figure 1 is a side elevation of a platform type of scale provided with the indicating mechanism comprising the present invention, Figure 2 is a detail vertical sectional view taken on the line indicated at 2—2 in Figure 1, Figure 3 is an edge elevation of the structure set forth in Figure 2, Figure 4 is a top plan view of the indicator.

Referring more particularly to the drawings the numeral 1 designates the frame of a platform scale of conventional construction. The scale embodies, as usual, a weight receiving platform 2 and a beam 3 which is pivotally mounted as at 4 upon the frame 1. The platform 2 is connected with the beam 3 by means of the usual stillyard arm 5 in order that the beam may oscillate upon the application of weights to the platform. Connected with the shorter side of the beam 3 is a dash pot 6 and mounted for sliding movement on the upper and lower arm of the beam are the tare or poise weights 7. The outer end of the beam is formed to include a nose 8 from which is pivotally suspended a weight receiver 9. Weight disks of known value are adapted to be placed, as usual, upon the receiver 9 and these weights, in connection with the adjustable weights 7, are manipulated to balance the applied weights on the platform 2, as is customary in scales of this type. Fixed and spaced stops 10 cooperate with the nose 8 of the beam to limit its oscillation.

As previously stated, it is a difficult matter in the operation of scales of this kind to determine within close limits when the beam 3 is in a true state of balance. Ordinarily, this is accomplished by adjusting the more sensitive poise weights 7, but when large bodies are being weighed it is difficult for an operator to determine whether the operation is correct when high standards of accuracy are taken into consideration. Many operators provide for permissible error in the reading of this type of scale and it is the purpose of the present invention to minimize this error to the greatest possible extent consistent with practical operations.

To attain this I have provided an indicating mechanism B which, in the present form of the invention, comprises an indicator pointer or arm 11 which is mounted for oscillation in a vertical plane. The mounting of the pointer is effected by means of a thin strip of resilient metal, as at 12, one end of said strip being firmly clamped in a supporting bracket 13 carried by the frame 1, while the opposite end of the strip is similarly clamped to the inner bifurcated end 14 of the pointer 11. As shown in Figure 1, the pointer is spaced from the bracket 13 leaving a free resilient portion or zone of flexure in the strip 12. This zone is of sufficient length to permit of free swinging movement on the part of the pointer within the working limits of the indicating mechanism.

To effect the operation of the pointer the nose 8 of the beam 3 has secured thereto a metallic tongue 15 which overhangs the end of the nose 8 and has its outer portion provided with substantially V fingers 16. Similarly, the enlarged ring shaped body portions 17 of the pointer 11 is provided with a corresponding metallic tongue 18, which has its outer portion provided with fingers 19 which are formed to include V shaped seats. Connecting the tongues 15 and 18 is a push and pull element 20, which has its opposite ends provided with enlarged heads 21, which are formed to include outer pairs of knife edges 22, the latter being seated resiliently within the fingers 16 and 19 provided on the outer edges of the tongues 15 and 18. The heads 21 are also provided with slots 23 having knife edge walls 24, which register with the knife edges 22. The edges 24 cooperate with the V shaped seats provided in the intermediate fingers 16 and 19 of the tongues 15 and 18. The resiliency of the tongues 15 and 18 is such as to maintain the push and pull element 20 under tension so that the knife edges provided upon the elements 20 will be firmly positioned within the V shaped seats provided in the fingers 16 and 19.

This construction is very simple to produce and assemble and has the advantage of minimizing friction and the attendant losses in the operating connections between the beam and the indicator. Moreover, it readily accommodates itself to the different arcs of swinging movements of the beam 3 and the pointer 11. The outer end of the pointer 11 operates over a graduated surface 25 which may be suitably calibrated to denote ounces or fractions of ounces. It will be seen that the construction provides for a great multiplication of movement on the part of the pointer with reference to the movement of the platform 2. In the first place the arm 5 uniting the platform with the beam is located very close to the pivotal point 4 of the beam. This results in augmented movement on the part of the nose 8 with reference to the platform. Then, by reason of the fact that the element 20 connects the extreme outermost portion of the beam 3 with the indicator pointer 11 as close as possible to the axis of turning movement of the pointer, it follows that the outer end of the pointer will be movable through a multiplied range of swinging movement as regards the beam 3. It is by virtue of this construction that I am enabled to indicate a fractional part of an ounce in an applied weight and to make corresponding corrections in a manner which would not be possible were the indicating mechanism B omitted. I also consider the particular methods disclosed for connecting the beam with the indicating pointer to be of very considerable importance in reducing friction losses to a minimum and it is for this reason that I prefer to use the element 20 and the construction for mounting the same, although the invention is not limited thereto except in so far as the same is specifically set forth in the following claims.

What is claimed is:

1. In a scale, a pivotally mounted balanced beam, a swinging indicator, a support, a resilient connection between said support and said indicator, and a link flexibly connecting an outer portion of said beam with the inner portion of said indicator.

2. In a scale, a frame, a pivotally mounted beam of the even balanced type carried by said frame, an indicator flexibly mounted on said frame independently of said beam, and a link flexibly secured at its ends to the outer portion of said beam and the inner portion of said indicator.

3. In a scale, a frame, a pivotally mounted even balanced beam carried by said frame, an indicator, a support for said indicator carried by said frame, a resilient metallic strap having the opposite end portions thereof secured to said support and to the inner end of said indicator, and a link uniting an outer portion of said beam with the inner portion of said indicator, said link where joined with said beam and indicator having anti-friction bearings.

4. In a scale, a frame, a pivotally mounted even balanced beam, an indicator, a flexible resilient support for said indicator carried by said frame independently of said beam, complemental tongues of resilient material carried by an outer portion of said beam and the inner portion of said indicator, and a link having the opposite end portions thereof flexibly secured to the outer portions of said tongues.

5. In a scale, a frame, a pivotally mounted beam of the even balance type carried by said frame, a swinging indicator, a support therefor, said indicator and beam lying substantially parallel with each other when in a balanced or neutral position and with the indicator arranged above the beam, a link resiliently connecting the outer end of said beam and the inner portion of said indicator and flexible means for returning said beam and indicator to their neutral position.

6. In a scale, a frame, a pivotally mounted even balance beam, an indicator, a support therefor, a flexible resilient mounting between said indicator and said support, the resilient mounting being such as to hold the indicator in parallel relation with said beam when both are in a neutral position, a link connecting the outer end of said beam with the inner portion of said indicator, said resilient mounting also serving to return the beam to a neutral position.

In testimony whereof I affix my signature.

WALTER S. SMITH.